(12) United States Patent
  Tamura

(10) Patent No.: US 9,925,866 B2
(45) Date of Patent: Mar. 27, 2018

(54) WORK VEHICLE

(71) Applicant: ISEKI & CO., LTD., Ehime-ken (JP)

(72) Inventor: Kazuhisa Tamura, Ehime-ken (JP)

(73) Assignee: Iseki & Co., LTD., Ehime-Ken (JP)

( * ) Notice: Subject to any disclaimer, the term of this patent is extended or adjusted under 35 U.S.C. 154(b) by 0 days.

(21) Appl. No.: 14/932,381

(22) Filed: Nov. 4, 2015

(65) Prior Publication Data

US 2016/0129783 A1    May 12, 2016

(30) Foreign Application Priority Data

Nov. 7, 2014  (JP) .................. 2014-227351

(51) Int. Cl.
  *B60K 3/00*    (2006.01)
  *B60K 15/067*  (2006.01)
  *B60K 15/063*  (2006.01)
  *B60R 3/00*    (2006.01)

(52) U.S. Cl.
  CPC .......... *B60K 15/067* (2013.01); *B60K 15/063* (2013.01); *B60R 3/00* (2013.01); *B60K 2015/0634* (2013.01); *B60Y 2200/221* (2013.01)

(58) Field of Classification Search
  CPC ................ A01D 2101/00; A01D 69/06; B60Y 2010/114; B60R 3/00; B60R 2011/004
  See application file for complete search history.

(56) References Cited

U.S. PATENT DOCUMENTS

2014/0097591 A1*  4/2014  Fujimoto ................. B60R 3/00
                                                   280/164.1

FOREIGN PATENT DOCUMENTS

JP          2009-45991 A     3/2009

* cited by examiner

*Primary Examiner* — Bryan A Evans
(74) *Attorney, Agent, or Firm* — Finnegan, Henderson, Farabow, Garrett & Dunner LLP

(57) ABSTRACT

A tractor is provided. The tractor includes step brackets that are attached to a transmission case forming a vehicle body and that supports a step, a heat shield plate that is projected upward from a front section of the transmission case, fuel tank stays that extend downward from a lower section of the heat shield plate and that are attached to the fuel tank. The tractor also includes fenders serving as mud guards; and mud guard covers attached to the step brackets. The fuel tank stays are attached to the step brackets. The mud guard covers are attached to the fenders and the fuel tank.

12 Claims, 15 Drawing Sheets

WORK VEHICLE

CROSS REFERENCE TO RELATED APPLICATION

This applications claims benefit of priority from Japanese Patent Application No. 2014-227351, filed Nov. 7, 2014, the disclosure of which is incorporated herein by reference.

TECHNICAL FIELD

The present invention relates to a work vehicle.

BACKGROUND

In work vehicles in the form of tractors, providing a compact design and ensuring adequate fuel capacity by placing a fuel tank under a step on which the operator in a driver's seat places his or her feet is known (e.g., refer to Patent Document 1: Japanese Laid-open Patent Publication No. 2009-45991).

The tractor in Patent Document 1 has disadvantages in that a complex structure is used to support the fuel tank and that adequate rigidity cannot be provided with a simple structure.

SUMMARY

One object of the present invention is to address these problems and to provide a work vehicle in which a fuel tank can be located below a step while providing adequate rigidity with a simple structure.

In order to overcome the problems above and achieve the object of the invention, a first aspect provides a work vehicle (1) equipped with: a heat shield plate (9) projecting upward above a front section of a transmission case (8) of a vehicle body (2); and a fuel tank stay (70) extending downward from a lower section of the heat shield plate (9) and supporting a fuel tank (12).

Since the fuel tank (12) is supported by the fuel tank stay (70) that extends downward from the lower section of the heat shield plate (9), the fuel tank (12) can be suspended from above, thus providing a simple support structure.

According to a second aspect of the present invention, there is provided a work vehicle (1) according to the first aspect of the present invention further equipped with a step bracket (50) that is attached to the transmission case (8) and that supports the step (40), wherein the fuel tank stay (70) is attached to the step bracket (50).

In addition to the advantages provided by the first aspect of the present invention, it is possible to improve the rigidity of the fuel tank stay (70) since the tank stay (70) is attached to the step bracket (50) attached to the transmission case (8).

According to a third aspect of the present invention, there is provided a work vehicle (1) according to the first aspect of the present invention further equipped with a step bracket (50) attached to the transmission case (8) and supporting a step (40) and fenders (11) covering left and right rear wheels (5) of the vehicle body (2), wherein: the step bracket includes a mud guard cover (80); and the mud guard cover (80) is attached to at least one of the fenders (11) and supports the fuel tank (12).

In addition to the advantages provided by the first aspect of the present invention, it is possible to provide a simplified structure since the attachment of the mud guard cover (80) to the fuel tank (12) means that the mud guard cover (80) serves to support the fuel tank (12) as well. Furthermore, the rigidity of the mud guard cover (80) and the like can be improved since the mud guard cover (80) provided on the step bracket (50) is attached to the fender (11) and supports the fuel tank (12).

According to a fourth aspect of the present invention, there is provided a work vehicle (1) according to the second aspect of the present invention further equipped with fenders (11) covering left and right rear wheels (5) of the vehicle body (2), wherein: the step bracket (50) includes a mud guard cover (80); and the mud guard cover (80) is attached to the fender (11) and supports the fuel tank (12).

In addition to the advantages provided by the second aspect of the present invention, it is possible to provide a simplified structure since the mud guard cover (80) is attached to the fuel tank (12) so that the mud guard cover (80) is used to support the fuel tank (12) as well. Furthermore, the rigidity of the mud guard cover (80) and the like can be improved since the mud guard cover (80) provided on the step bracket (50) is attached to the fender (11) and supports the fuel tank (12).

According to a fifth aspect of the present invention, there is provided a work vehicle (1) according to the first aspect of the present invention wherein: a pair of the fuel tank stays (70) is provided at left and right sides of the vehicle body (2); and the pair of fuel tank stays (70) is shaped to be substantially axially symmetrical relative to a center line (P) that passes through a lateral midpoint of the vehicle body (2) and that extends along a longitudinal axis.

In addition to the advantages provided by the first aspect of the present invention, it is possible to provide good lateral balance for the work vehicle (1) and the fuel tank (12) can be supported in a balanced manner since the left and right fuel tank stays (70) are shaped to be substantially axially symmetrical. Furthermore, the number of molds needed to manufacture the fuel tank stays (70) can be reduced, thus reducing manufacturing costs.

According to a sixth aspect of the present invention, there is provided a work vehicle (1) according to the second aspect of the present invention wherein: a pair of the fuel tank stays (70) is provided at left and right sides of the vehicle body (2); and the pair of fuel tank stays (70) is shaped to be substantially axially symmetrical relative to a center line (P) that passes through a lateral midpoint of the vehicle body (2) and that extends along a longitudinal axis.

In addition to the advantages provided by the second aspect of the present invention, it is possible to provide good lateral balance for the work vehicle (1) and the fuel tank (12) can be supported in a balanced manner since the left and right fuel tank stays (70) are shaped to be substantially axially symmetrical. Furthermore, the number of molds needed to manufacture the fuel tank stays (70) can be reduced, thus reducing manufacturing costs.

According to a seventh aspect of the present invention, there is provided a work vehicle (1) according to the third aspect of the present invention wherein: a pair of the fuel tank stays (70) is provided at left and right sides of the vehicle body (2); and the pair of fuel tank stays (70) is shaped to be substantially axially symmetrical relative to a center line (P) that passes through a lateral midpoint of the vehicle body (2) and that extends along a longitudinal axis.

In addition to the advantages provided by the third aspect of the present invention, it is possible to provide good lateral balance for the work vehicle (1) and the fuel tank (12) can be supported in a well-balanced manner since the left and right fuel tank stays (70) are shaped to be substantially axially symmetrical. Furthermore, the number of molds needed to manufacture the fuel tank stays (70) can be reduced, thus reducing manufacturing costs.

According to an eighth aspect of the present invention, there is provided a work vehicle (1) according to the fourth aspect of the present invention wherein: a pair of the fuel tank stays (70) is provided at left and right sides of the vehicle body (2); and the pair of fuel tank stays (70) is shaped to be substantially symmetrical relative to a center line (P) that passes through a lateral midpoint of the vehicle body (2) and that extends along a longitudinal axis.

In addition to the advantages provided by the fourth aspect of the present invention, it is possible to provide good lateral balance for the work vehicle (1) and the fuel tank (12) can be supported in a balanced manner since the left and right fuel tank stays (70) are shaped to be substantially axially symmetrical. Furthermore, the number of molds needed to manufacture the fuel tank stays (70) can be reduced, thus reducing manufacturing costs.

According to a ninth aspect of the present invention, there is provided a work vehicle (1) according to the third aspect of the present invention wherein: a pair of the mud guard covers (80) is provided at left and right sides of the vehicle body (2); and the pair of mud and covers (80) is shaped to be substantially axially symmetrical relative to a center line (P) that passes through a lateral midpoint of the vehicle body (2) and that extends along a longitudinal axis.

In addition to the advantages provided by the third aspect of the present invention, it is possible to provide good lateral balance for the work vehicle (1) and the fuel tank (12) can be supported in a balanced manner since the left and right mud guard covers (80) are shaped to be substantially axially symmetrical. Furthermore, the number of molds needed to manufacture the mud guard covers (80) can be reduced, thus reducing manufacturing costs.

According to a tenth aspect of the present invention, there is provided a work vehicle (1) according to the fourth aspect of the present invention wherein: a pair of the mud guard covers (80) is provided at left and right sides of the vehicle body (2); and the pair of mud guard covers (80) is shaped to be substantially axially symmetrical relative to a center line (P) that passes through a lateral midpoint of the vehicle body (2) and that extends along a longitudinal axis.

In addition to the advantages provided by the fourth aspect of the present invention, it is possible to provide good lateral balance for the work vehicle (1) and the fuel tank (12) can be supported in a balanced manner since the left and right mud guard covers (80) are shaped to be substantially axially symmetrical. Furthermore, the number of molds needed to manufacture the mud guard covers (80) can be reduced, thus reducing manufacturing costs.

According to an eleventh aspect of the present invention, there is provided a work vehicle (1) according to the seventh invention wherein: a pair of the mud guard covers (80) is provided at left and right sides of the vehicle body (2); and the pair of mud guard covers (80) is shaped to be substantially axially symmetrical relative to a center line (P) that passes through a lateral midpoint of the vehicle body (2) and that extends along a longitudinal axis.

In addition to the advantages provided by the seventh aspect of the present invention, it is possible to provide good lateral balance for the work vehicle (1) and the fuel tank (12) can be supported in a balanced manner since the left and right mud guard covers (80) are shaped to be substantially axially symmetrical. Furthermore, the number of molds needed to manufacture the mud guard covers (80) can be reduced, thus reducing manufacturing costs.

According to a twelfth aspect of the present invention, there is provided a work vehicle (1) according to the eighth invention wherein: a pair of the mud guard covers (80) is provided at left and right sides of the vehicle body (2); and the pair of mud guard covers (80) is shaped to be substantially axially symmetrical relative to a center line (P) that passes through a lateral midpoint of the vehicle body (2) and that extends along a longitudinal axis.

In addition to the advantages provided by the eighth aspect of the present invention, it is possible to provide good lateral balance for the work vehicle (1) and the fuel tank (12) can be supported in a balanced manner since the left and right mud guard covers (80) are shaped to be substantially axially symmetrical. Furthermore, the number of molds needed to manufacture the mud guard covers (80) can be reduced, thus reducing manufacturing costs.

With the work vehicle 1 according to the present invention, the fuel tank 12 can be provided below the step 40 while providing adequate rigidity with a simple structure.

DETAILED DESCRIPTION OF EXEMPLARY EMBODIMENTS

The present invention will be described in detail using the drawings. The present invention, however, is not limited to the embodiment described below. In addition, the configuration elements in the embodiments described below cover elements that could be easily conceived by a person skilled in the art as well as substantially identical elements, i.e., elements within the scope of the doctrine of equivalents. Furthermore, the configuration elements in the embodiments below can be combined as appropriate.

Figure 1:
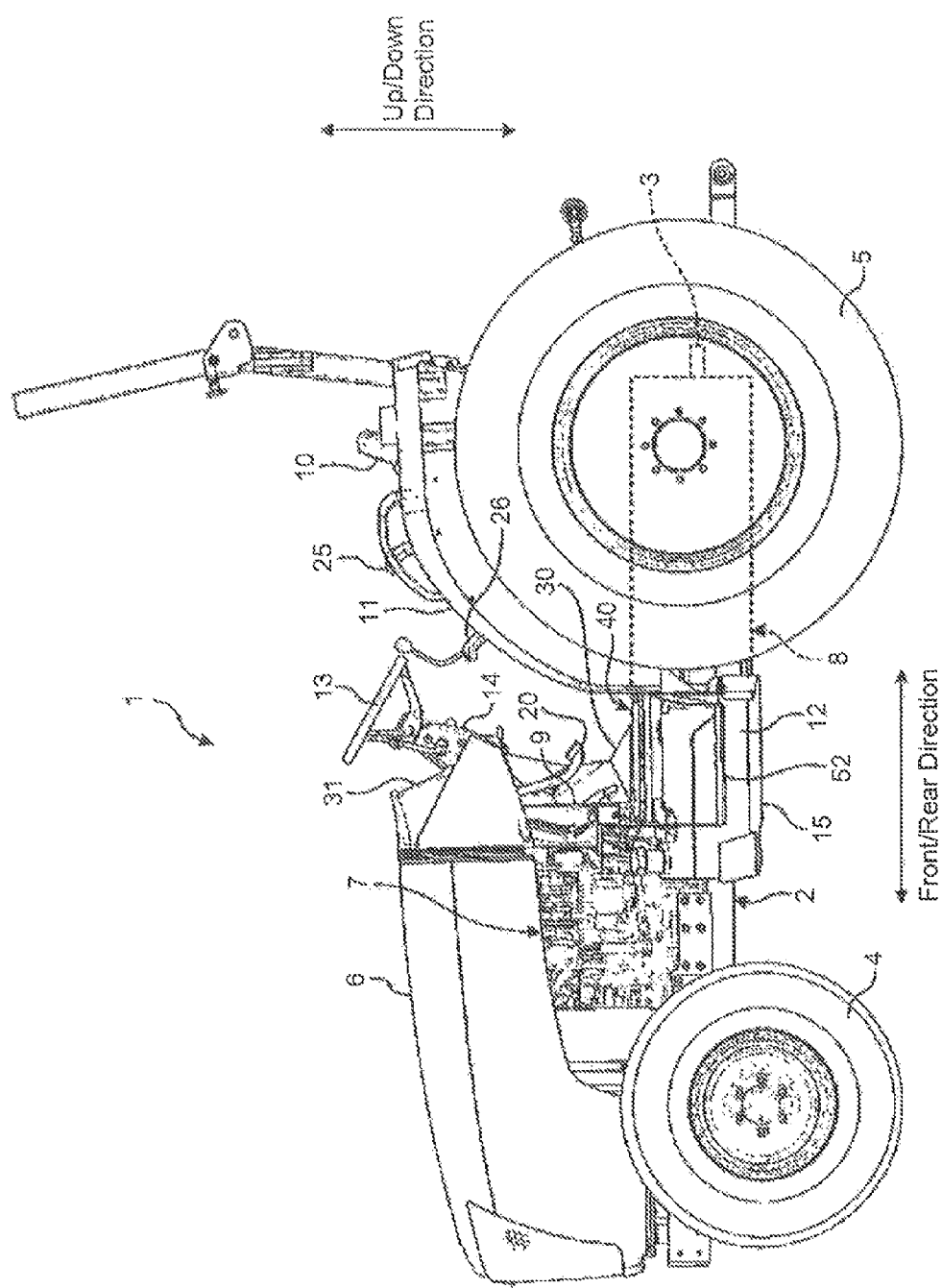
FIG. 1 is a side-view of a tractor according to an embodiment.
Figure 2:
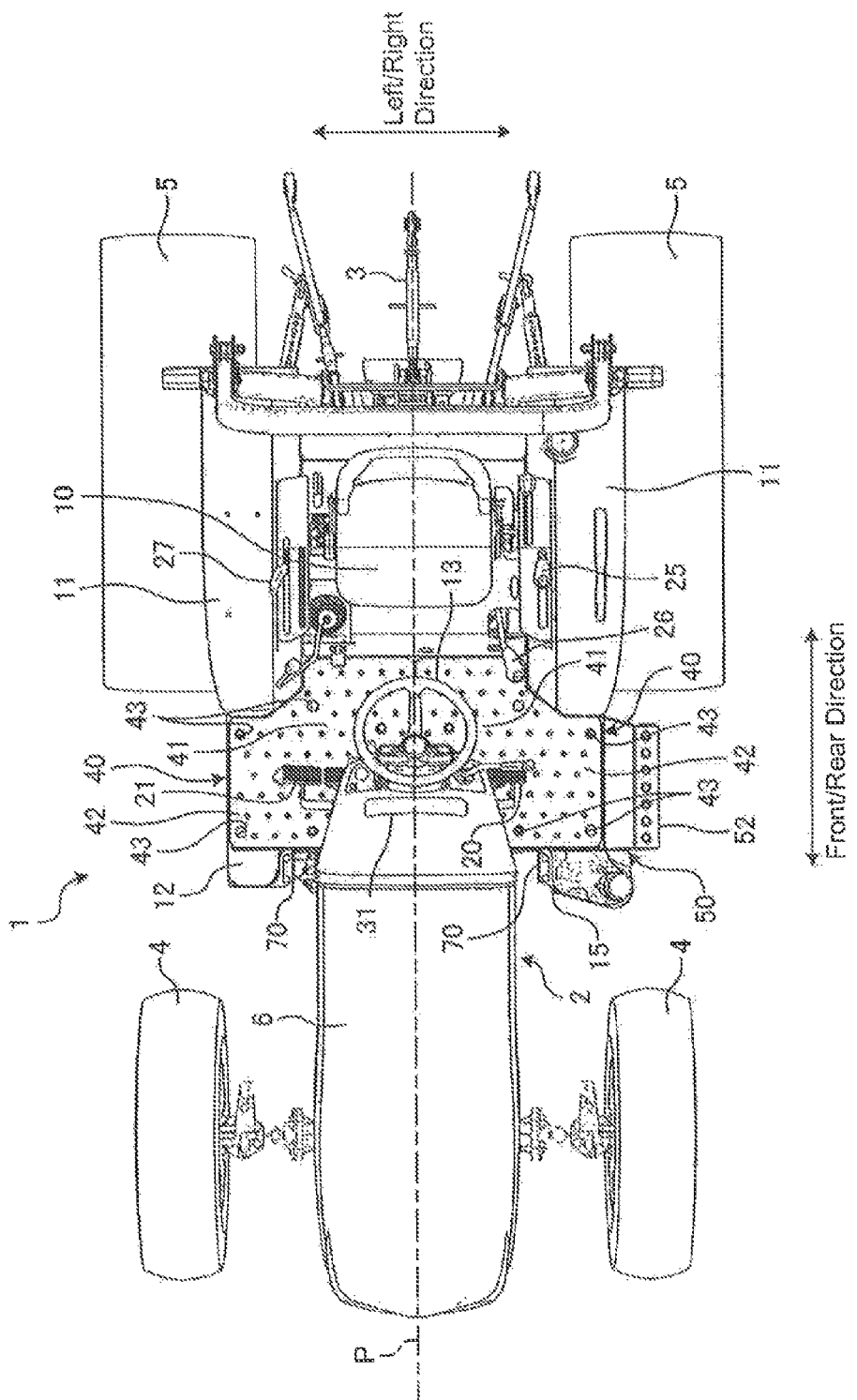
FIG. 2 is a plan view of a tractor according to an embodiment.
Figure 3:
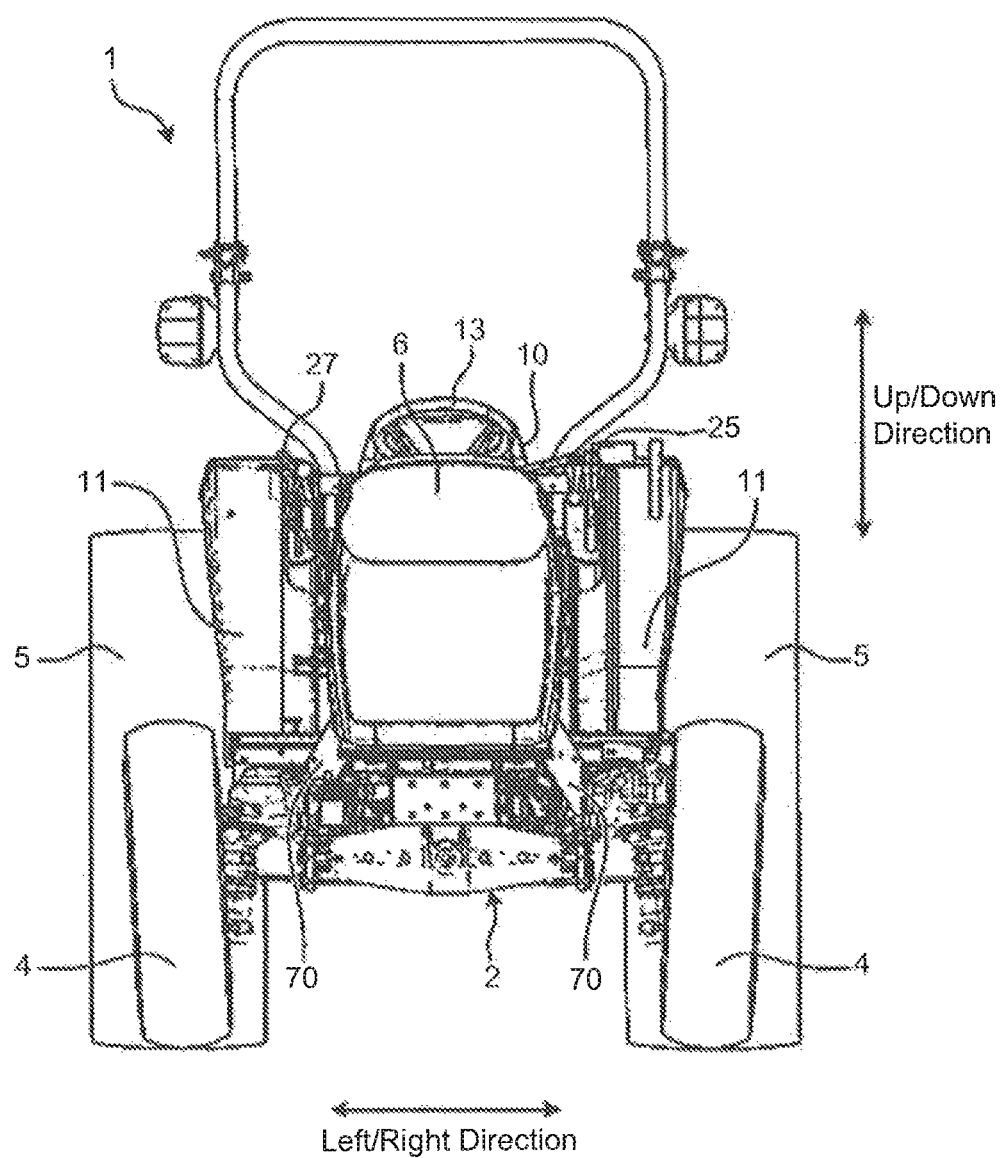
FIG. 3 is a front-view of a tractor according to an embodiment.
Figure 4:
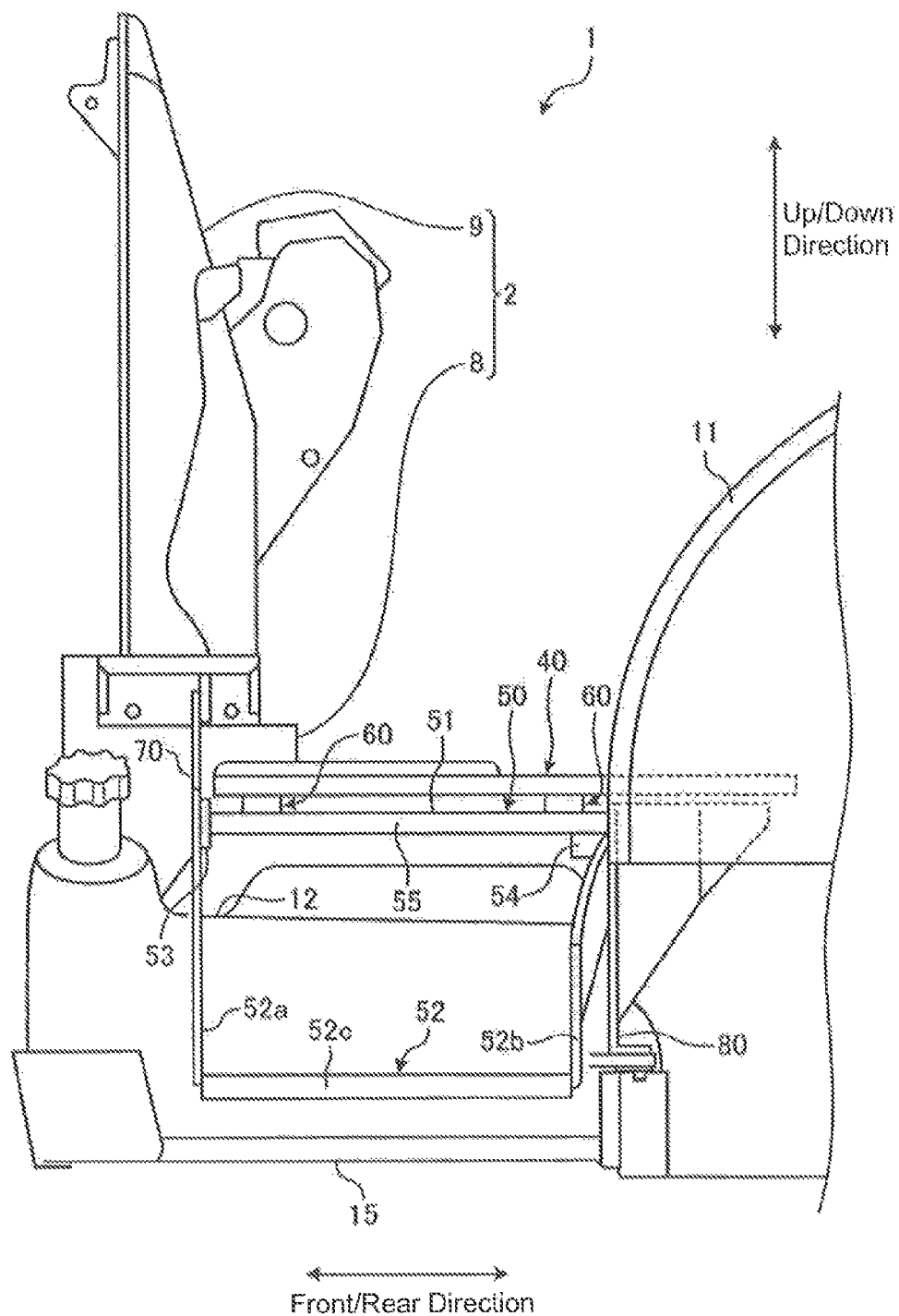
FIG. 4 is a simplified side-view of a step and the like of a tractor according to an embodiment.
Figure 5:
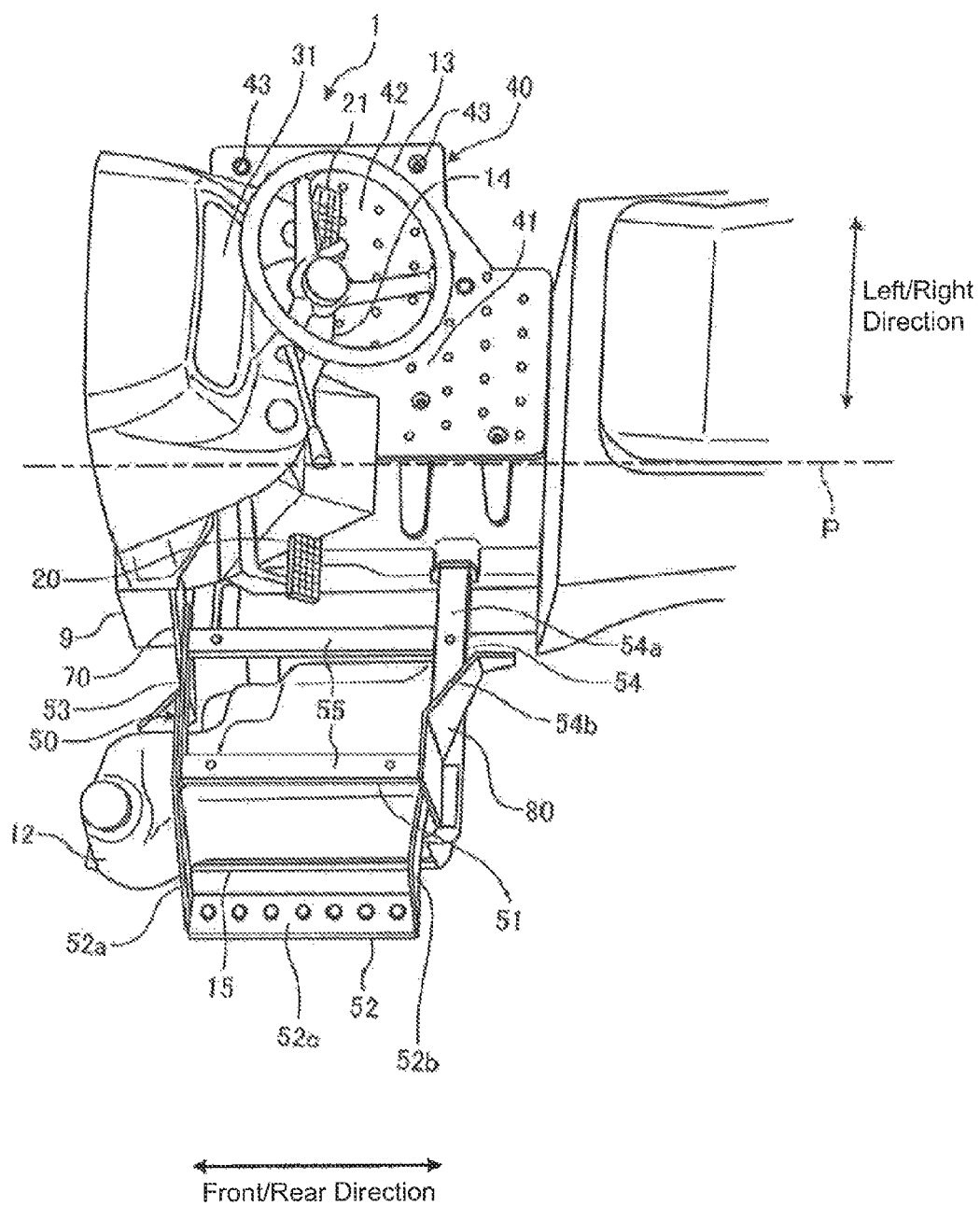
FIG. 5 is a perspective view as seen from above a step and the like of a tractor according to an embodiment.
Figure 6:
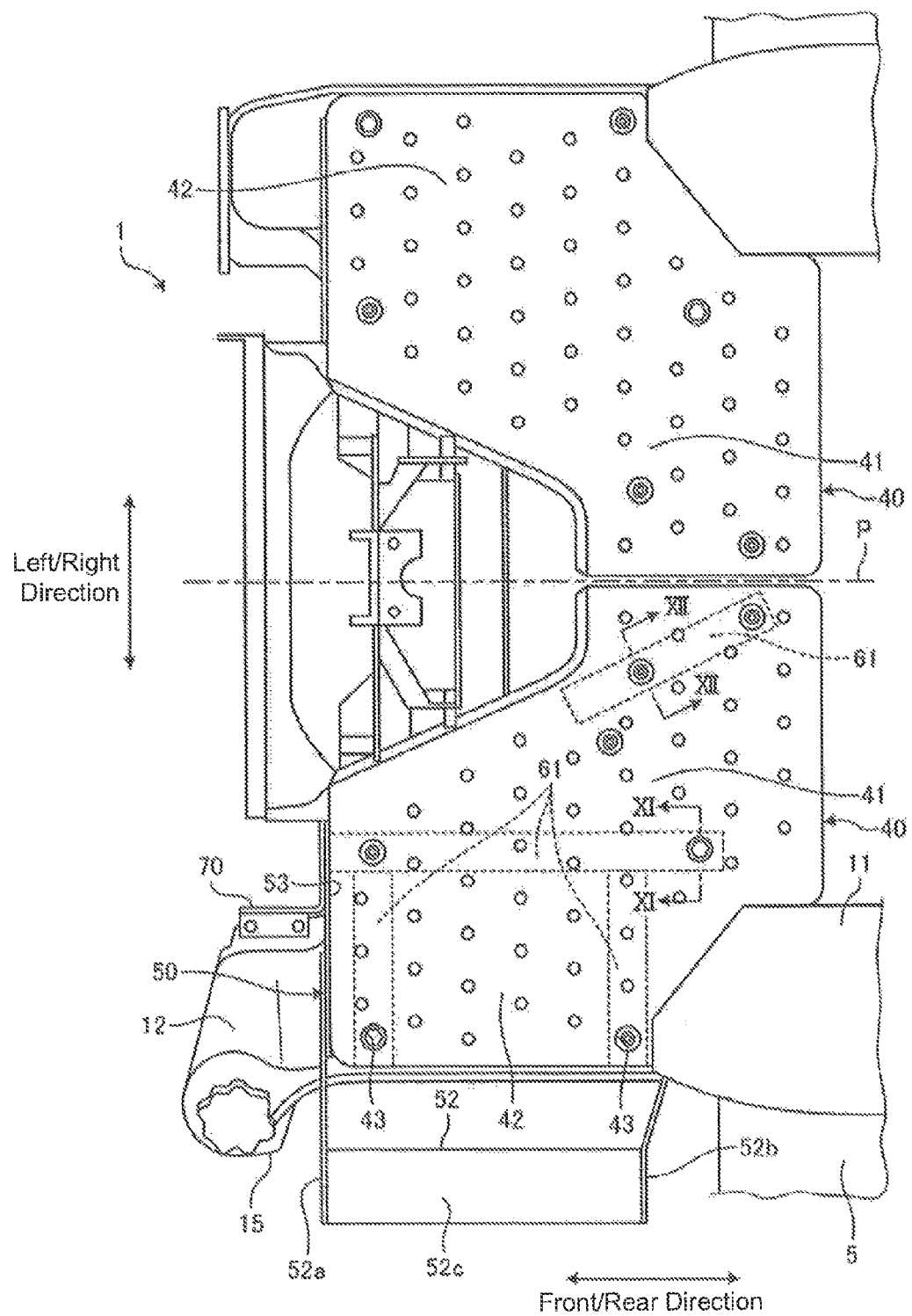
FIG. 6 is a plan view of main elements of a tractor according to an embodiment.
Figure 7:
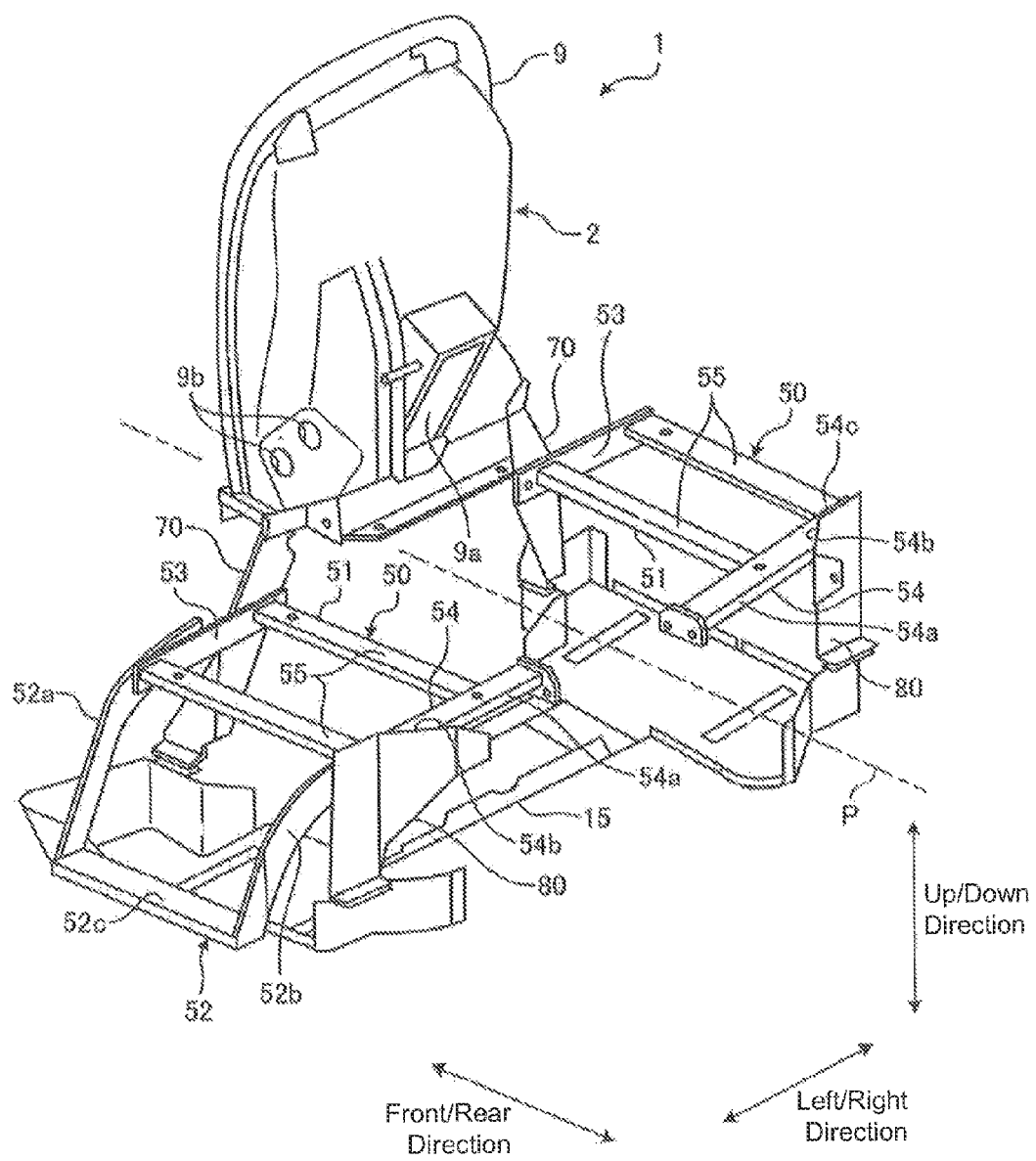
FIG. 7 is a perspective view of main elements in FIG. 5.
Figure 8:
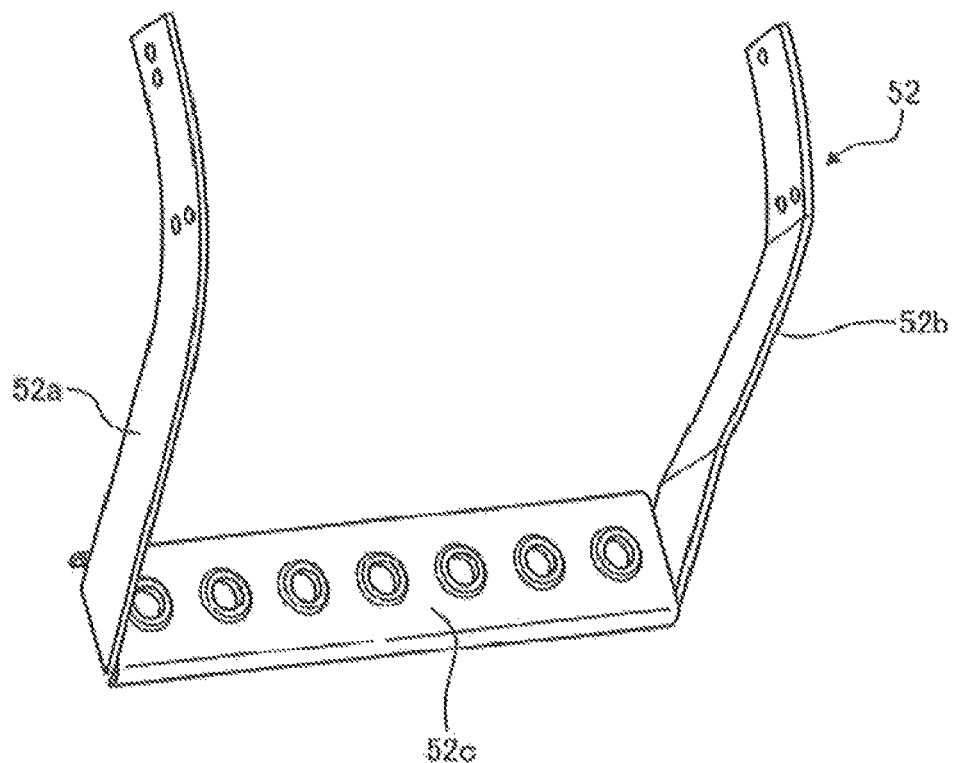
FIG. 8 is a perspective view of an assisting step shown in FIG. 7.
Figure 9:
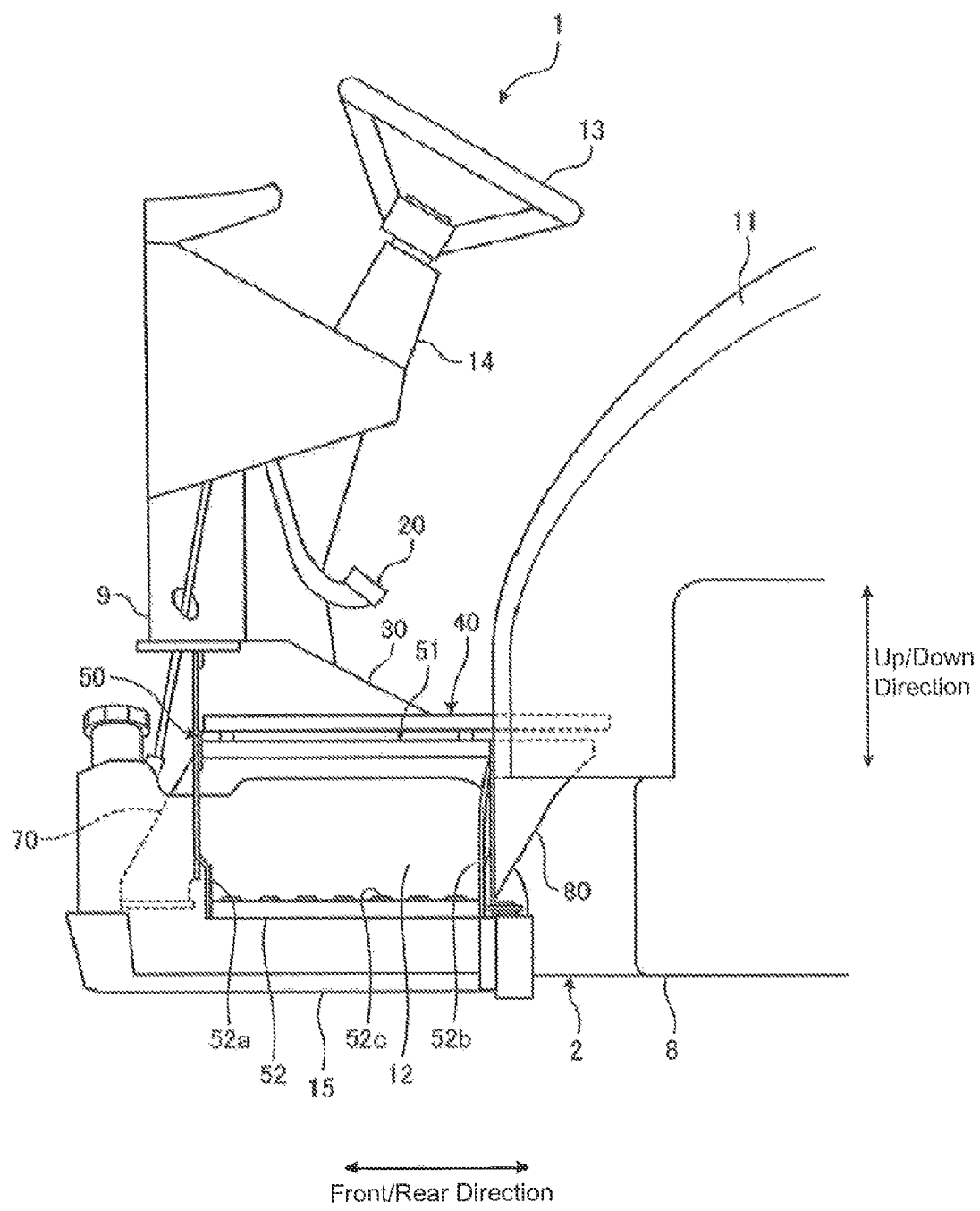
FIG. 9 is a side-view of main elements of a tractor according to an embodiment.
Figure 10:
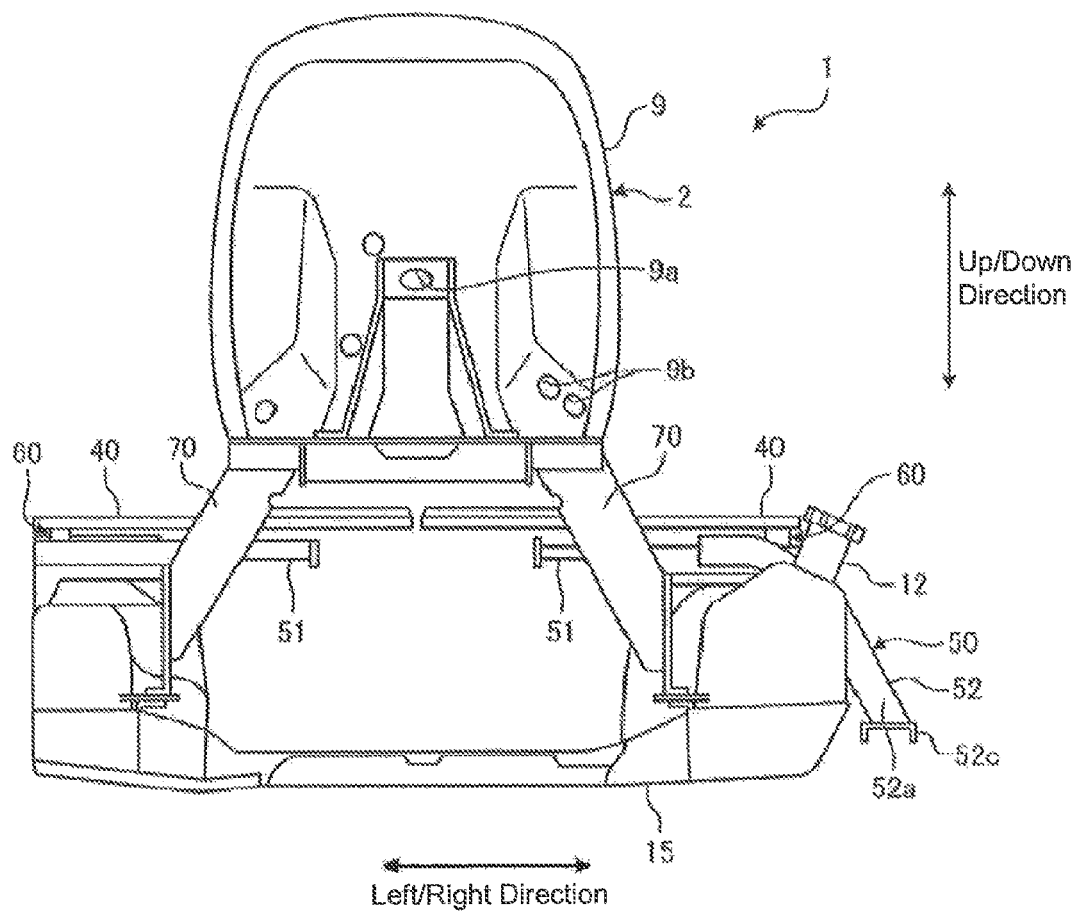
FIG. 10 is a front-view of main elements of a tractor according to an embodiment.
Figure 11:
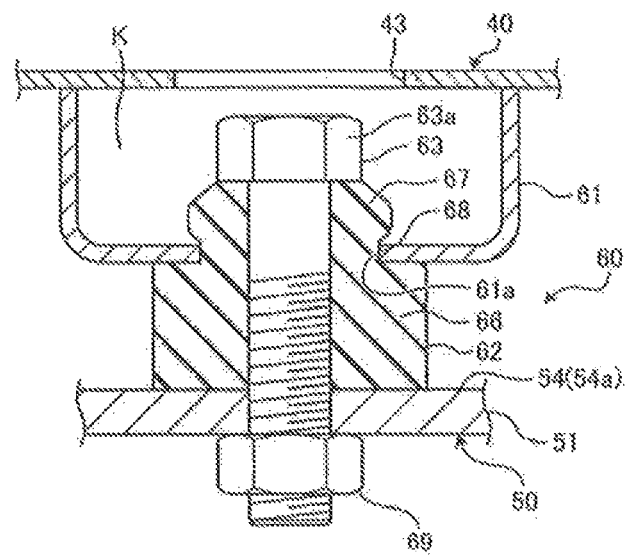
FIG. 11 is a cross-section view along the XI-XI line in FIG. 6.
Figure 12:
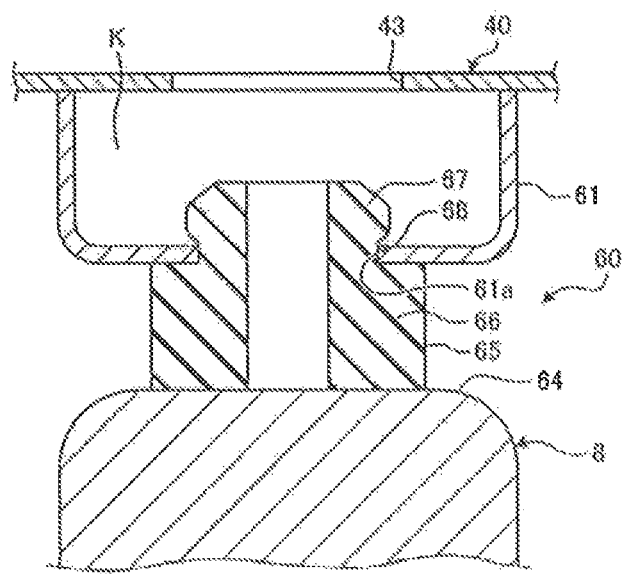
FIG. 12 is a cross-section view along the XII-XII line in FIG. 6.
Figure 13:
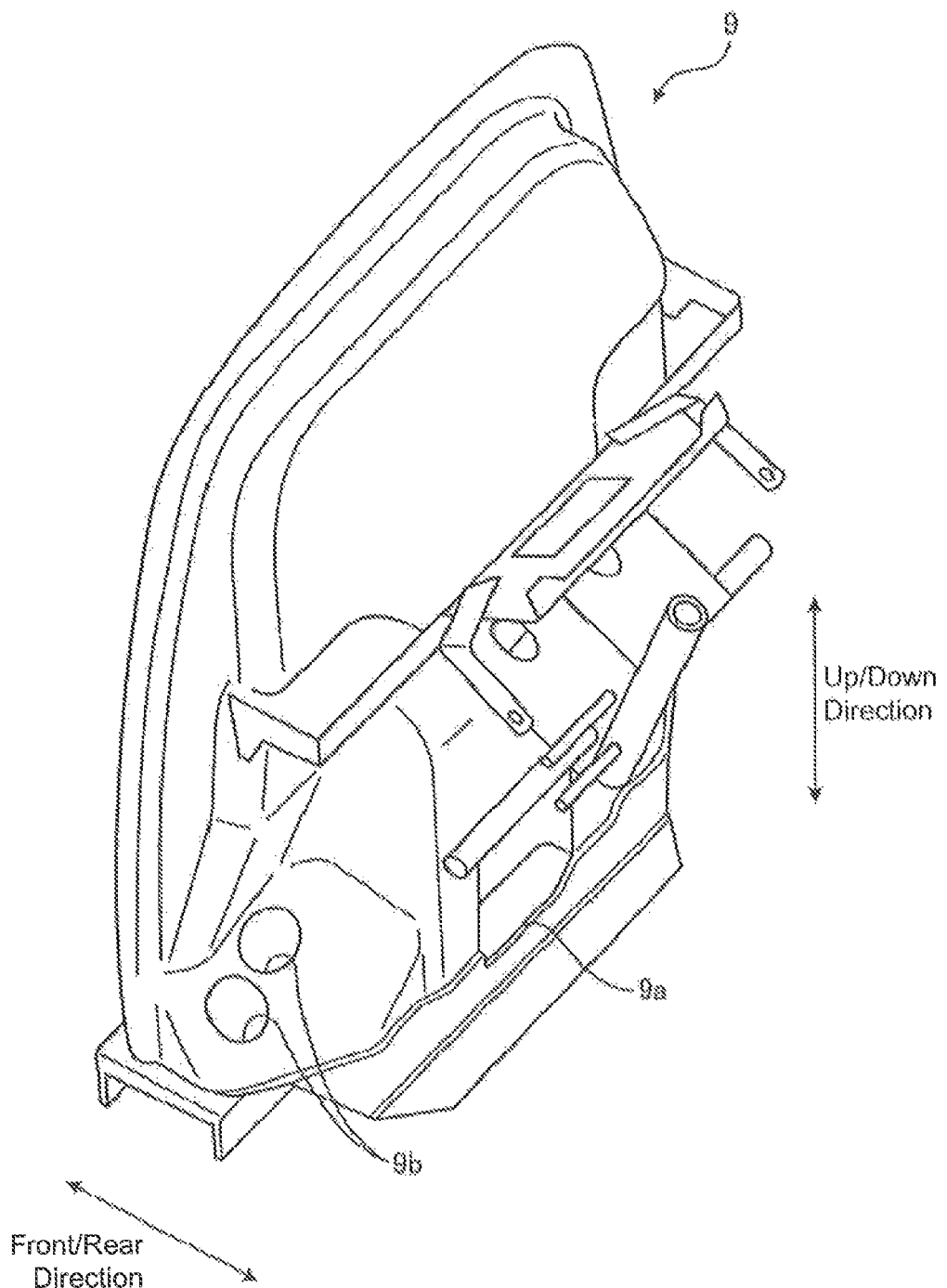
FIG. 13 is a perspective view of a heat shield plate of a tractor according to an embodiment.
Figure 14:
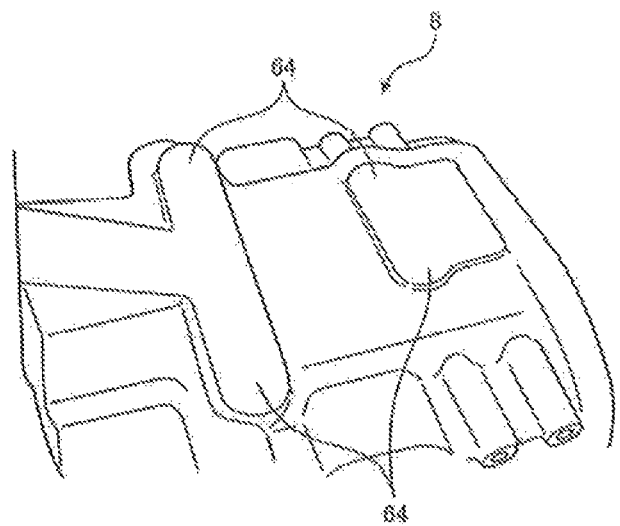
FIG. 14 is a perspective view of a transmission case of a tractor according to an embodiment.
Figure 15:
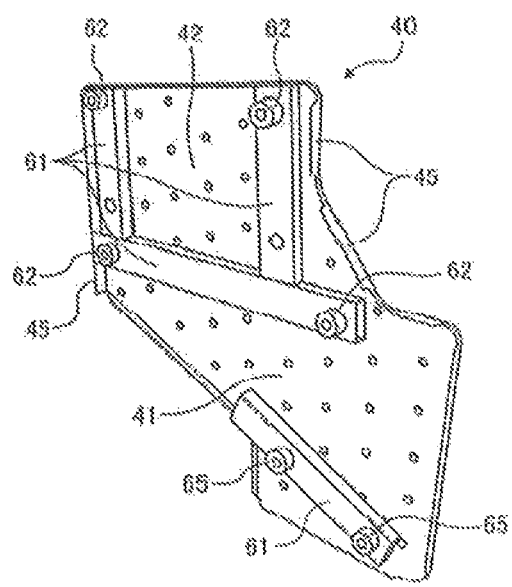
FIG. 15 is a perspective view as seen from below a step of a tractor according to an embodiment.
Figure 16:
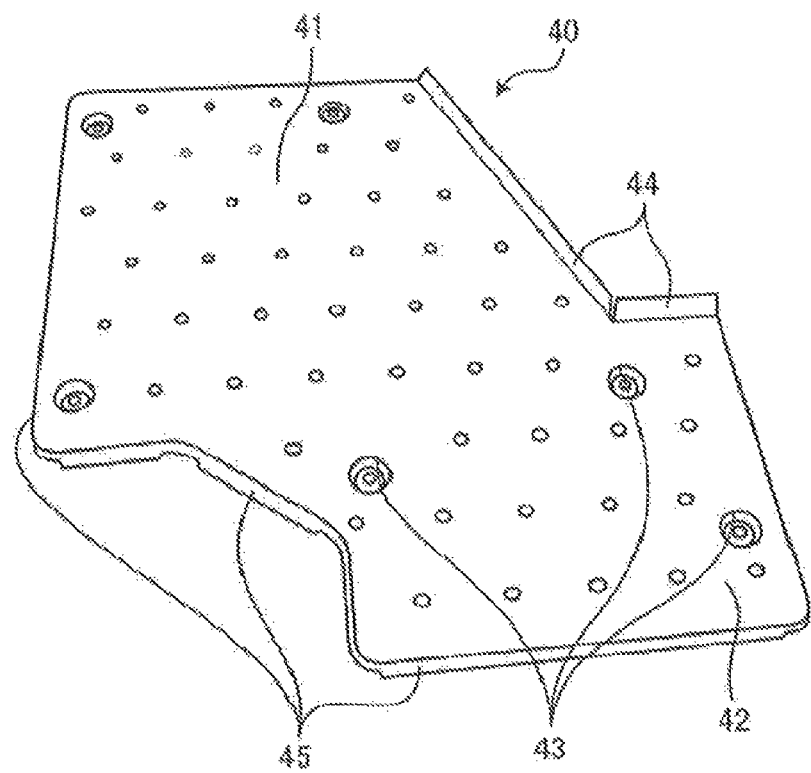
FIG. 16 is a perspective view as seen from above a step of a tractor according to an embodiment.
Figure 17:
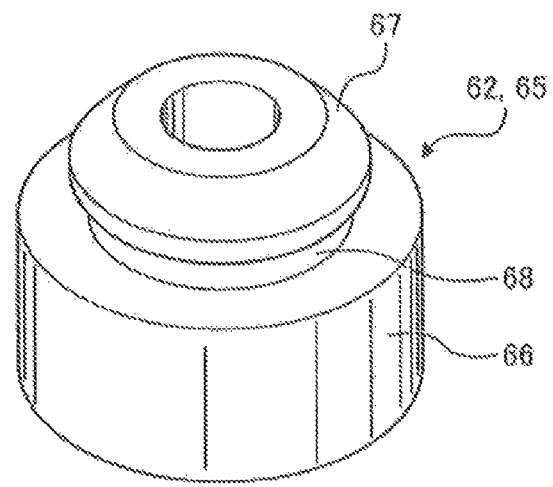
FIG. 17 is a perspective view of a vibration-damping body of a tractor according to an embodiment.
Figure 18:
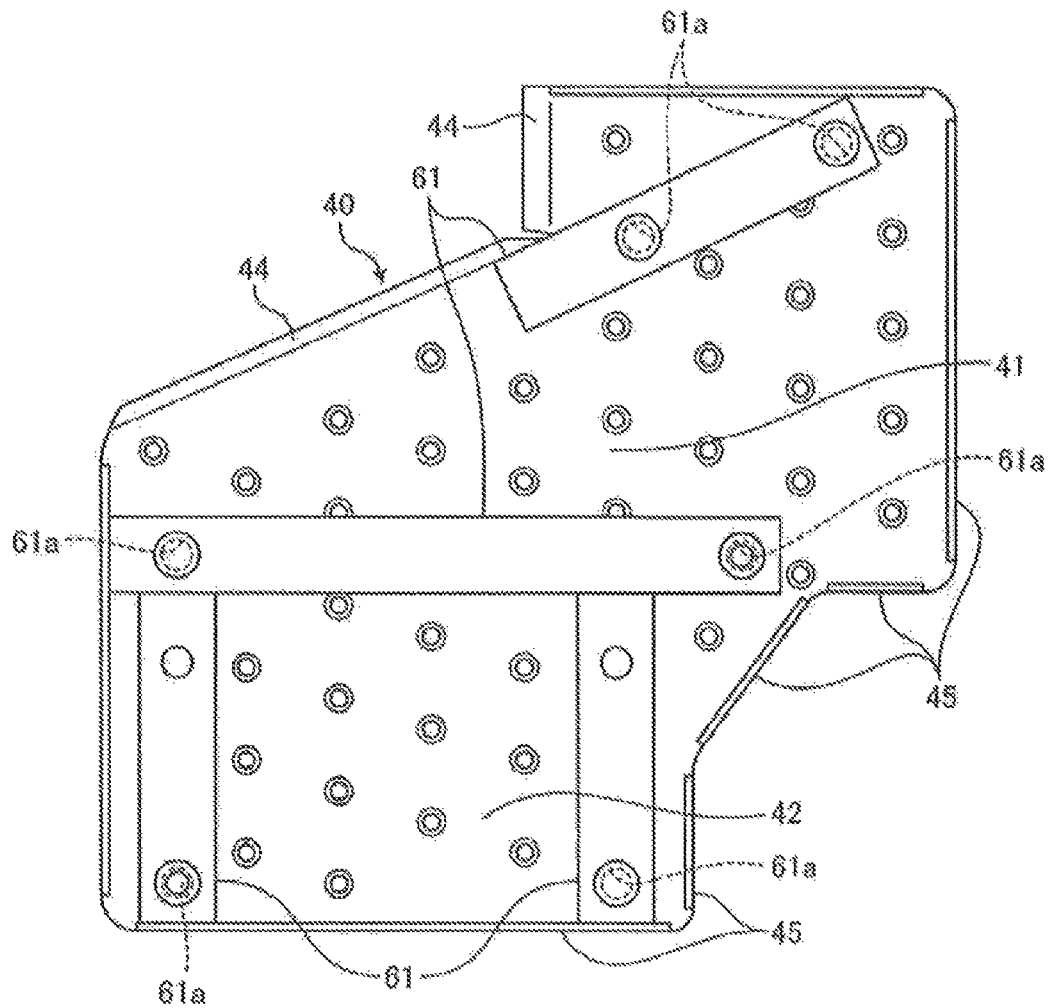
FIG. 18 is a plan view as seen from below a step of a tractor according to an embodiment.

A work vehicle in the form of a tractor 1 according to an embodiment of the present invention will be described using the drawings. FIG. 1 is a side-view of a tractor according to an embodiment. FIG. 2 is a plan view of a tractor according to an embodiment. FIG. 3 is a front-view of a tractor according to an embodiment. FIG. 4 is a simplified side-view of a step and the like of a tractor according to an embodiment. FIG. 5 is a perspective view as seen from above a step and the like of a tractor according to an embodiment. FIG. 6 is a plan view of main elements of a tractor according to an embodiment. FIG. 7 is a perspective view of main elements in FIG. 5. FIG. 8 is a perspective view of an assisting step shown in FIG. 7. FIG. 9 is a side-view of main elements of a tractor according to an embodiment. FIG. 10 is a front-view of main elements of a tractor according to an embodiment. FIG. 11 is a cross-section view along the XI-XI line in FIG. 6. FIG. 12 is a cross-section view along the XII-XII line in FIG. 6. FIG. 13 is a perspective view of a heat shield plate of a tractor according to an embodiment. FIG. 14 is a perspective view of a transmission case of a tractor according to an embodiment. FIG. 15 is a perspective view as seen from below a step of a tractor according to an embodiment. FIG. 16 is a perspective view as seen from above a step of a tractor according to an embodiment. FIG. 17 is a perspective view of a vibration-damping body of a tractor according to an embodiment. FIG. 18 is a plan view as seen from below a step of a tractor according to an embodiment.

The tractor 1 according to an embodiment is a work vehicle used to perform tasks in the field and the like. In the following description, the direction of forward motion of the tractor 1 is referred to as the front (the left-hand side in FIG. 1 and FIG. 2), the opposite direction is referred to as the rear (the right-hand side in FIG. 1 and FIG. 2), the horizontal directions perpendicular to the front/rear direction (i.e., the longitudinal axis) of the tractor 1 are referred to as the left/right direction (i.e., the lateral axis), and the vertical directions perpendicular to the front/rear direction of the tractor 1 are referred to as the up/down direction (i.e., the vertical axis).

As shown in FIG. 1, FIG. 2, and FIG. 3, the tractor 1 is equipped with a vehicle body 2 that includes front wheels 4 provided as wheels for steering and rear wheels 5 provided as driving wheels. An engine 7 (shown in FIG. 1) installed in a bonnet 6 at the front of the vehicle body 2 generates power that is transmitted to the rear wheels 5 after undergoing speed reduction at a primary transmission device and a secondary transmission device not shown in the drawings. The rear wheels 5 are driven by this power.

In addition, power generated by the engine 7 of the tractor 1 can be transmitted to the front wheels 4 as well by way of a front-wheel speed-up switching mechanism (not shown in the drawings) after undergoing speed reduction at the primary transmission device and the secondary transmission device. If the front-wheel speed-up switching mechanism of the tractor 1 is transmitting power, all four wheels, i.e., the front wheels 4 and the rear wheels 5, are driven by the power transmitted from the engine 7. If the front-wheel speed-up switching mechanism is not transmitting power, only two wheels, i.e., the rear wheels 5, are driven by the power transmitted from the engine 7. In other words, the tractor 1 is capable of switching between two-wheel drive and four-wheel drive. In addition, a PTO (power take-off) output shaft 3 that can be attached to an implement such as a rotary tiller (not shown in the drawings) is provided at the rear of the vehicle body 2 of the tractor 1.

As shown in FIG. 1, FIG. 4, FIG. 5, and the like, the vehicle body 2 includes: a transmission case 8 that houses the primary transmission device, the secondary transmission device, the front-wheel speed-up switching device, a PTO transmission unit that transmits power to the PTO output shaft 3, and the like; and a heat shield plate 9 that is attached to the front of the transmission case 8. In the vehicle body 2, the engine 7 is installed in front of the heat shield plate 9, the engine 7 is covered by a bonnet 6, the transmission case 8 extends to the rear of the vehicle body 2 from the heat shield plate 9, a driver seat 10 is provided above the rear section of the transmission case 8, and fenders 11 serving as mud guards are provided to the left and right of the driver seat 10.

The fenders 11 serving as mud guards extend toward the front above the rear wheels 5 and cover the rear wheels 5 to block mud thrown up by the rear wheels 5. The tractor 1 is equipped with: the transmission case that forms part of the vehicle body 2; the driver seat 10 provided above the rear section of the transmission case 8; and the fenders 11 serving as mud guards provided to the left and right of the driver seat 10.

The driver seat 10 is provided between the left and right mud guard fenders 11 for the driver to sit while operating the tractor 1. As shown in FIG. 1 and FIG. 2, a steering wheel 13 for steering the front wheels 4 is provided at the front of the driver seat 10. The steering wheel 13 is provided at the upper end of a steering column 14 that rotatably supports the steering wheel 13. As shown in FIG. 2, a clutch pedal 20, a brake pedal 21 for controlling the rear wheels 5 when the pedal is operated, and an accelerator pedal (not shown in the drawings) are provided below the steering column 14, i.e., near the driver's feet when the driver is seated in the driver seat 10.

On the right side of the driver seat 10, there is provided an implement lift lever 27 for controlling the raising and lowering of an implement, e.g., a rotary tiller (not shown in the drawings), coupled at the rear of the tractor 1. On the left side of the driver seat 10, there is provided a primary transmission lever 25 for performing operations relating to the primary transmission device when the tractor 1 is running and a secondary transmission lever 26 for the secondary transmission device. The primary transmission lever 25 can perform primary transmission operations, i.e., control the primary transmission device, and can be switched between automatic transmission, in which primary transmission is controlled automatically, and manual transmission, in which the driver controls transmission manually. In manual transmission mode, the primary transmission lever 25 switches the axle ratio of the primary transmission device to one of eight settings. The secondary transmission lever 26 controls the secondary transmission device and can switch the vehicle speed to very low speed, low speed, medium speed, high speed, or neutral.

The transmission case 8 and the heat shield plate 9 of the vehicle body 2 are metallic. As shown in FIG. 4, the heat shield plate 9 is projected upward from the front of the transmission case 8 and shields the driver seat 10 from hot air coming from the engine 7. The heat shield plate 9 is formed as a plate that projects upward from the front of the transmission case 8. As shown in FIG. 13, the heat shield plate 9 is formed with a wider lower end.

A hole 9a through which the steering column 14 and the like is inserted is formed at the center of the lower end of the heat shield plate 9. In addition to the steering column 14, hoses for power steering, a power-steering, unit, and a steering mechanism connecting the front wheels 4 and the steering wheel 13 are passed through the hole 9*a*. Rods (not shown in the drawing) connected to the clutch pedal 20, the brake pedal 21, and the accelerator pedal are passed through holes 9*b* formed at the left and right ends of the lower end of the heat shield plate 9.

Attached to the side of the heat shield plate 9 facing the driver seat 10 are: a cover 30 (shown in FIG. 1, FIG. 9, and the like) that accommodates the hoses for power steering, the power-steering unit, the steering mechanism, and the like and that provides a neat outer appearance; and a display device 31 (shown in FIG. 2) that provides various information to the driver. The cover 30 is provided at the lateral center of the heat shield plate 9. Power steering hoses, the power-steering unit, and the steering mechanism are passed through the hole 9*a* formed at the bottom center of the heat shield plate 9, thus improving the outer appearance, increasing the strength of the structure, and making assembly and routing easier.

As shown in FIG. 4, FIG. 5, and FIG. 6, flat steps 40 are attached horizontally near where the driver's feet would be when the driver is seated in the driver seat 10. The step 40 is provided above the transmission case 8 and a step bracket 50, which is attached to the transmission case 8 and supports the step 40. Left and right steps 40 are provided on either side of the vehicle body 2. The planar shape of this pair of steps 40 is axially symmetrical relative to a center line P (indicated by a dotted line in FIG. 2, FIG. 6, and the like) that passes through the midpoint of the left/right axis of the vehicle body 2 and that is parallel to the from/rear axis. The steps 40 are co-planar and the inner ends thereof about each other above the transmission case 8.

The steps 40 are formed as flat metal plates and are equipped with: slanted sections 41 that extend outward from the lateral midpoint of the vehicle body 2 while slanting toward the front; and outward-oriented sections 42 that extend outward to the left and right of the vehicle body 2. Each step 40 is supported by a step bracket 50.

The step brackets 50 are secured to the left and right sides of the front section of the transmission case 8 using bolts or the like. When secured to the transmission case 8, the step brackets 50 project outward to the left and right from the transmission case 8. Each step bracket 50 is equipped with a main bracket unit 51 formed as a frame and an assisting step 52 attached to the main bracket unit 51.

The main bracket unit 51 is equipped with a front securing member 53, a rear securing member 54, and connecting members 55 that connect the securing members 53, 54. The rear securing members 54 are attached to the left and right sides of the transmission case 8 using bolts (not shown in the drawings). The front securing members 53 are extended in a straight line parallel to the left/right axis when seen from above. Each of the front securing members 53 is formed with a cross-section shape that is flat and extends along the up/down axis. The rear securing member 54 is provided behind the front securing member 53 and is equipped with: a first horizontal section 54*a* (shown in FIG. 5) that is secured to the transmission case 8 and extends along the left/right axis; and a sloped section 54*b* (shown in FIG. 5) that is positioned laterally outward from the first horizontal section 54*a*. The first horizontal section 54*a* is formed from a flat, rectangular pipe. The end of the rectangular pipe forming the first horizontal section 54*a* is processed, e.g., by cutting, to form the sloped section 54*b*, which slants relative to both the front/rear axis and the left/right axis, i.e., extends laterally outward while extending forward.

In this embodiment, two connecting members 55 are provided. Each connecting member 55 is formed from a rectangular pipe that is straight and flat, the long side of the member extending along the front/rear axis. The two connecting members 55 are separated by a space along the left/right axis and are parallel to each other. The ends of the connecting members 55 are connected to the main bracket unit 51, e.g., by being welded to the securing members 53, 54.

The driver is able to step on the assisting step 52 when stepping up to the step 40. As shown in FIG. 8, the assisting step 52 is equipped with a pair of securing members 52*a*, 52*b* and a step member 52*c* that connects the ends of the securing members 52*a*, 52*b*. The securing member 52*a* overlaps with the front securing member 53 and is secured to the front securing member 53. The other securing member 52*b* overlaps with the rear securing member 54 and is secured to the rear securing member 54. The securing member 52*b* is sloped relative to the front/rear axis and the horizontal plane so that it extends laterally outward while gradually extending forward.

As a result, the securing member 52*b* prevents the assisting step 52 from obstructing the rear wheel 5. As shown in FIG. 10, when secured with the securing members 53, 54, the securing members 52*a*, 52*b* extend laterally outward from the main bracket unit 51 while gradually curving downward when seen from the front. The step member 52*c* connects the ends of the securing members 52*a*, 52*b* and is used as a step when the driver is entering or leaving the vehicle. As shown in FIG. 2, the assisting step 52 in this embodiment is provided only for the left step bracket 50 of the vehicle body 2 and is not provided for the right step bracket 50.

The steps 40 described above are secured to the step brackets 50 using vibration-damping securing structure 60 (shown in FIG. 11 and FIG. 12), i.e., the tractor 1 is equipped with the vibration-clamping securing structures 60. Each vibration-damping securing structure 60 is provided between the step 40 and the step bracket 50, secures the step 40 to the step bracket 50, and prevents vibrations from the transmission case 8 from being transmitted to the step 40.

As shown in FIG. 11 and FIG. 12, the vibration-damping securing structure 60 is equipped with: a reinforcement 61; a vibration-damping body 62 (shown in FIG. 11); a bolt 63 (shown in FIG. 11) serving as a securing member; a mounting surface 64 (shown in FIG. 12); and a second vibration-damping body 65 (shown in FIG. 12).

As shown in FIG. 15 and FIG. 18, the reinforcements 61 are attached, e.g., by welding, to the lower surface of the step 40. The reinforcement 61 is formed with a flat, U-shaped cross section from a metal or the like, with the two ends of the cross section being welded to the lower surface of the step 40. The reinforcements 61 are positioned on the step 40 to align with the rear securing member 54 and the connecting members 55 of the step bracket 50, i.e., on the outward-oriented section 42 at the entry/exit (laterally outward) side of the step 40. In addition, the reinforcements 61 are provided on the slanted section 41 to align with the mounting surfaces 64 of the transmission case 8. Thus, the reinforcements 61 are secured to the step 40 so that a space K is formed with the lower surface of the step 40. In addition, the reinforcements 61 are formed with holes 61*a* that pass through the surfaces facing the step bracket 50 and the transmission case 8. The holes 61*a* are formed with a circular planar shape and are aligned with the vibration-damping bodies 62 and the second vibration-damping bodies 65.

The vibration-damping bodies 62 and the second vibration-damping bodies 65 are formed from an elastic material such as rubber and have the same shape in this embodiment. As shown in FIG. 11, FIG. 12, and FIG. 17, each vibration-damping body 62 and second vibration-damping body 65 is formed integrally from: a cylindrical main unit 66; and a tapered press fit section 67 that is continuous with the upper end of the main unit 66 and that is pressed into a hole 61a. A small-diameter section 68 is formed narrower than and interposed between the main unit 66 and the press fit section 67.

The outer diameter of the main unit 66 and the outer diameter of the section of the press fit section 67 located toward the main unit 66 are larger than the inner diameter of the hole 61a. The outer diameter of small-diameter section 68 is substantially identical to the inner diameter of the hole 61a. The outer diameter of the section of the press fit section 67 located away from the main unit 66 is smaller than the inner diameter of the hole 61a. The vibration-damping bodies 62 are positioned: above the front and rear ends of the connecting member 55 that is located laterally outward out of the two connecting members 55 of the step bracket 50; above the front end of the inner connecting member 55; and above the central section of the first horizontal section 54a of the rear securing member 54.

The lower ends of the vibration-damping bodies 62 are abutted against the step bracket 50 while the press fit sections 67 at the upper ends are pressed into the hole 61a so that they project into the space K formed by the reinforcements 61. The second vibration-damping bodies 65 are provided on the mounting surfaces 64 formed on the transmission case 8 and are positioned between the mounting surfaces 64 and the step 40. The lower ends of the second vibration-damping bodies 65 are abutted against the mounting surface 64 and the press fit sections 67 at the upper ends are pressed into the holes 61a so that they project into the space K formed by the reinforcements 61. The press fit sections 67 of the vibration-damping bodies 62, 65 are positioned inside the space K and the small-diameter sections 68 are positioned inward from the hole 61a. In the present invention, the vibration-damping bodies 62 and the second vibration-damping bodies 65 can have different shapes, e.g., the second vibration-damping bodies 65 can be formed without holes for the bolts 63.

The bolts 63 secure the upper ends of the vibration-damping bodies 62 to the step bracket 50. The bolts 63 are passed through the vibration-damping bodies 62 provided above the front end of the connecting member 55 positioned laterally outward and above the central section of the first horizontal section 54a of the rear securing member 54. The bolts 63 are screwed into weld nuts 69 attached ahead of time to the connecting members 55 of the main bracket unit 51 of the step bracket 50. When the bolts 63 are screwed into the weld nuts 69, the vibration-damping bodies 62 are interposed between heads 63a and the connecting members 55, thus securing to the main bracket unit 51 of the step bracket 50 the vibration-damping bodies 62, i.e., the reinforcements 61 of the step 40 with the holes 61a into which the vibration-damping bodies 62 have been pressed. The head 63a of the bolt 63 comes into contact with the press fit section 67 of the vibration-damping body 62 and does not come into contact with the reinforcement 61, i.e., the step 40. Through holes 43 for the bolts 63 aligned with the vibration-damping bodies 62 and the second vibration-damping bodies 65 are formed on the step 40. In the present invention, it would also be possible to form the through holes 43 solely at positions aligned with the vibration-damping bodies 62 secured by the bolts.

As shown in FIG. 14, the mounting surfaces 64 are formed as flat surfaces on the upper surface of the transmission cases 8. The mounting surfaces 64 are formed by cutting the upper surface of the transmission case 8 to form a flat surface parallel to the horizontal plane. Two mounting surfaces 64 are provided for each of the steps 40.

When vibration from the engine 7 or the like causes the transmission case 8 to vibrate, the vibration-damping bodies 62, 65 of the vibration-damping securing structures 60 are elastically deformed by the vibration of the transmission case 8, and the elastic restoring force of the vibration-damping bodies 62, 65 damps the vibration. By damping vibration, the vibration-damping securing structure 60 prevents vibration from being transmitted to the step 40.

As shown in FIG. 16 and FIG. 18, upwardly bent sections 44 are provided at the sections of the outer edges of the step 40 that extend to the cover 30 at the center front section of the transmission case 8. The outer sides of the upwardly bent sections 44 are covered by the cover 30, which is provided above the front section of the transmission case 8 and is attached to the driver seat 10 side of the heat shield plate 9. In addition, downwardly bent sections 45 are provided at the sections of the outer edge of the step 40 other than the sections that extend to the cover 30 at the center front section of the transmission case 8, as shown in FIG. 16 and FIG. 18.

As shown in FIG. 1 and FIG. 4, in the tractor 1 described above, a fuel tank 12, which holds fuel to be supplied to the engine 7, is provided below the steps 40 and the step brackets 50 and extends along the left and right ends of the step brackets 50. As shown in FIG. 4 and FIG. 7, the front end of the fuel tank 12 is secured to the vehicle body 2 by left and right fuel tank stays 70, and the rear end is secured to the vehicle body 2 by left and right mud guard covers 80. The bottom of the fuel tank 12 is protected by a tank cover 15. The tractor 1 is equipped with: the tank cover 15 provided below the step bracket 50 to protect the fuel tank 12; the pair of fuel tank stays 70; and the pair of mud guard covers 80; The fuel tank stays 70 and the mud guard covers 80 are provided on the left and the right of the vehicle body 2.

Each of the fuel tank stays 70 is formed from a metal with a first end being secured to the bottom of the heat shield plate 9 using a bolt (not shown in the drawings). The fuel tank stays 70 extend below and laterally outward from the bottom of the heat shield plate 9. More specifically, the fuel tank stays 70 slant relative to the left/right axis and the vertical axis, i.e., extend laterally outward from the bottom of the heat shield plate 9 while gradually sloping downward, as shown in FIG. 10. Second ends of the fuel tank stays 70 are secured (attached) with bolts (not shown in the drawings) to the front ends of the fuel tank 12 and the tank cover 15. In addition, the fuel tank stays 70 are secured (attached) with a bolt (not shown in the drawings) to the front securing member 53 of the main bracket unit 51 of the step bracket 50. In addition, the left and right fuel tank stays 70 are formed axially symmetrical to the center line P, as shown in FIG. 7.

The mud guard covers 80 block mud thrown up by the rear wheels 5. Each mud guard cover 80 is formed from a metal and is welded to the rear securing member 54 of the main bracket unit 51 of the step bracket 50. The mud guard covers 80 extend downward from where they are secured to the rear securing member 54 of the main bracket unit 51, with lower ends of the mud guard covers 80 being secured (attached) with bolts (not shown in the drawings) to the rear ends of the fuel tank 12 and the tank cover 15. The mud guard covers 80 extend laterally inward from where they are secured to the rear securing member 54 of the main bracket unit 51 and the fuel tank 12, the vertical dimension of the mud guard covers 80 gradually decreasing as they extend laterally inward. Thus, the vertical dimension of the mud guard covers 80 increases from the securing position at the rear securing member 54 of the main bracket unit 15 to the securing position at the fuel tank 12, and this serves to block mud thrown up from the rear wheels 5. The laterally inward ends of the mud guard covers 80 are secured (attached) with bolts (not shown in the drawings) to the lenders 11. In addition, the left and right mud guard covers 80 are formed axially symmetrical to the center line P, as shown in FIG. 7.

The tractor 1 according to this embodiment is configured as described above, and the operations thereof will be described. When the tractor 1 is running, the primary transmission lever 25, the secondary transmission lever 26, and the like are used to control transmission with regard to the primary transmission device and the secondary transmission device. An accelerator pedal (not shown in the drawings) adjusts the rotation speed of the engine 7. These operations are detected by sensors and sent to an ECU (not shown in the drawings). The ECU uses the received information to operate solenoids and the like, thereby controlling the operation of the engine 7 and the transmission of the primary transmission device and the secondary transmission device so that the vehicle runs in the preferred state.

In addition, steering adjustments are made by operating the steering wheel 13 and deceleration is performed by operating the brake pedal 21, in addition to deceleration, the brake pedal 21 is used for sudden turns.

The tractor 1 is capable of working in the field as well as running on the road. Different ranges of speeds are appropriate for when the vehicle is in the field and on the road. Thus, when the tractor 1 is raining, the speed range can be switched by operating the primary transmission lever 25 and the secondary transmission lever 26 depending on where the vehicle is running or the like, in other words, operating the primary transmission lever 25 and the secondary transmission lever 26 switches speed ranges during operation of the vehicle.

For example, when working in the field, the driver sets the primary transmission lever 25 to any one of the speed 1 to speed 8 speed settings and sets the secondary transmission lever 26 to either low or medium speed, depending on the speed used for the task.

When the tractor 1 is running on the road, it would be preferable for the primary transmission lever 25 to be set to any one of the speed 1 to speed 8 speed settings and the secondary transmission lever 26 to be set to high speed.

In the configuration of the tractor 1 of this embodiment as described above, the fuel tank stays 70 are attached to the heat shield plate 9 and the fuel tank 12, thus allowing the fuel tank 12 to be supported with a simple structure. In addition, the fuel tank stays 70 are extended from the heat shield plate 9 and are attached to the step brackets 50 attached to the transmission case 8, thus providing increased rigidity for the fuel tank stays 70. As a result, in this tractor 1 it is possible to provide the fuel tank 12 below the step 40 while providing adequate rigidity with a simple structure.

In addition, in this tractor 1, the mud guard covers 80 are attached to the fuel tank 12, with the mud guard covers 80 also serving to support the fuel tank 12, thus simplifying the structure. Furthermore, the mud guard covers 80 are attached to the fenders 11, the fuel tank 12, the tank cover 15, and the step brackets 50, thus providing improved rigidity for the mud guard covers 80 and the like.

In the tractor 1, the left and right fuel tank stays 70 are shaped symmetrically to each other, and the left and right mud guard covers 80 are shaped symmetrically to each other. Thus, good lateral balance is provided for the vehicle body 2 and the fuel tank 12 can be supported in a well-balanced manner. Furthermore, in the tractor 1, since the pair of fuel tank stays 70 and the pair of mud guard covers 80 are shaped symmetrically to the left and right, the number of molds needed to manufacture the fuel tank stays 70 and the mud guard covers 80 can be reduced, thus reducing cost.

What is claimed is:

1. A work vehicle, comprising:
    an engine;
    a driver seat;
    a step provided below said driver seat;
    a fuel tank having a bottom side provided below a step;
    a heat shield plate projecting upward above a front section of a transmission case of a vehicle body, said heat shield configured to shield said driver seat from hot air coming from said engine;
    a tank cover provided to protect said bottom side of said fuel tank; and
    a fuel tank stay extending downward from a lower section of said heat shield plate and supporting said fuel tank.

2. The work vehicle according to claim 1 further comprising a step bracket attached to said transmission case and supporting saki step, wherein said fuel tank stay is attached to said step bracket.

3. The work vehicle according to claim 1 further comprising a step bracket attached to said transmission case and supporting saki step and fenders covering left and right rear wheels of said vehicle body, wherein:
    said step bracket includes a mud guard cover; and
    said mud guard cover is attached to at least one of said fenders and supports said fuel tank.

4. The work vehicle according to claim 2 further comprising fenders covering left and right rear wheels of the vehicle body, wherein:
    said step bracket includes a mud guard cover; and
    said mud guard cover is attached to at least one of said fenders and supports said fuel tank.

5. The work vehicle according to claim 1 wherein:
    a pair of said fuel tank stays is provided at left and right sides of said vehicle body; and
    said pair of fuel tank stays is shaped to be substantially axially symmetrical relative to a center line that passes through a lateral midpoint of said vehicle body and that extends along a longitudinal axis.

6. The work vehicle according to claim 2 wherein:
    a pair of said fuel tank stays is provided at left and right sides of said vehicle body; and
    said pair of fuel tank stays is shaped to be substantially axially symmetrical relative to a center line that passes through a lateral midpoint of said vehicle body and that extends along a longitudinal axis.

7. The work vehicle according to claim 3 wherein:
    a pair of said fuel tank stays is provided at left and right sides of said vehicle body; and
    said pair of fuel tank stays is shaped to be substantially axially symmetrical relative to a center line that passes through a lateral midpoint of said vehicle body and that extends along a longitudinal axis.

8. The work vehicle according to claim 4 wherein:
    a pair of said fuel tank stays is provided at left and right sides of said vehicle body; and said pair of fuel tank stays is shaped to be substantially axially symmetrical relative to a center line that passes through a lateral midpoint of said vehicle body and that extends along a longitudinal axis.

9. The work vehicle according to claim 3 wherein:
a pair of said mud guard covers is provided at left and right sides of said vehicle body; and
said pair of mud guard covers is shaped to be substantially axially symmetrical relative to a center line that passes through a lateral midpoint of said vehicle body and that extends along a longitudinal axis.

10. The work vehicle according to claim 4 wherein:
a pair of said mud guard covers is provided at left and right sides of said vehicle body; and
said pair of mud guard covers is shaped to be substantially axially symmetrical relative to a center line that passes through a lateral midpoint of said vehicle body and that extends along a longitudinal axis.

11. The work vehicle according to claim 7 wherein:
a pair of said mud guard covers is provided at left and right sides of said vehicle body; and
said pair of mud guard covers is shaped to be substantially axially symmetrical relative to a center line that passes through a lateral midpoint of said vehicle body and that extends along a longitudinal axis.

12. The work vehicle according to claim 8 wherein:
a pair of said mud guard covers is provided at left and right sides of said vehicle body; and
said pair of mud guard covers is shaped to be substantially axially symmetrical relative to a center line that passes through a lateral midpoint of said vehicle body and that extends along a longitudinal axis.

* * * * *

UNITED STATES PATENT AND TRADEMARK OFFICE
CERTIFICATE OF CORRECTION

PATENT NO.          : 9,925,866 B2
APPLICATION NO.     : 14/932381
DATED               : March 27, 2018
INVENTOR(S)         : Kazuhisa Tamura It is certified that error appears in the above-identified patent and that said Letters Patent is hereby corrected as shown below:

In the Claims

Claim 2, Column 12, Line 29, "supporting saki step," should read -- supporting said step, --.

Claim 3, Column 12, Line 33, "supporting saki step and" should read -- supporting said step and --.

Signed and Sealed this
Tenth Day of July, 2018

Andrei Iancu
*Director of the United States Patent and Trademark Office*